(12) United States Patent
Lee

(10) Patent No.: US 10,564,174 B2
(45) Date of Patent: Feb. 18, 2020

(54) OPTICAL SENSING APPARATUSES, METHOD, AND OPTICAL DETECTING MODULE CAPABLE OF ESTIMATING MULTI-DEGREE-OF-FREEDOM MOTION

(71) Applicant: PixArt Imaging Inc., Hsin-Chu (TW)

(72) Inventor: Sai Mun Lee, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 245 days.

(21) Appl. No.: 15/697,433

(22) Filed: Sep. 6, 2017

(65) Prior Publication Data

US 2019/0072579 A1    Mar. 7, 2019

(51) Int. Cl.
| | |
|---|---|
| *G01P 13/02* | (2006.01) |
| *G06T 7/20* | (2017.01) |
| *H04N 5/232* | (2006.01) |
| *G01S 3/00* | (2006.01) |
| *G01C 23/00* | (2006.01) |

(52) U.S. Cl.
CPC ............... *G01P 13/02* (2013.01); *G01S 3/00* (2013.01); *G06T 7/20* (2013.01); *H04N 5/232* (2013.01); *H04N 5/23296* (2013.01); *G01C 23/00* (2013.01); *G06T 2207/20021* (2013.01); *G06T 2207/30244* (2013.01)

(58) Field of Classification Search
CPC . G01P 13/02; G06T 7/20; G06T 2207/30244; H04N 5/232; H04N 5/23296; G01S 3/00; G01C 23/00
See application file for complete search history.

(56) References Cited

U.S. PATENT DOCUMENTS

| | | | |
|---|---|---|---|
| 2006/0216010 A1* | 9/2006 | Yamanouchi | G03B 5/02 396/55 |
| 2011/0317937 A1* | 12/2011 | Narusawa | G06T 3/4038 382/294 |
| 2012/0105598 A1* | 5/2012 | Hiramoto | G03B 35/08 348/49 |

* cited by examiner

*Primary Examiner* — Brenda C Bernardi
(74) *Attorney, Agent, or Firm* — Winston Hsu

(57) ABSTRACT

A method capable of estimating multi-degree-of-freedom motion of an optical sensing apparatus includes: providing an image sensor having a pixel array having a plurality of image zones to sense and capture a frame; providing and using a lens to vary optical magnifications of a plurality of portion images of the frame to generate a plurality of reconstructed images with different of field of views, the portion images of the frame respectively corresponding to the image zones; and estimating and obtaining a motion result for each of the reconstructed images to estimate the multi-degree-of-freedom motion of the optical sensing apparatus.

23 Claims, 13 Drawing Sheets

Forward motion

Backward motion

Position roll motion

Offset pivot point

OPTICAL SENSING APPARATUSES, METHOD, AND OPTICAL DETECTING MODULE CAPABLE OF ESTIMATING MULTI-DEGREE-OF-FREEDOM MOTION

BACKGROUND OF THE INVENTION

1. Field of the Invention

The invention relates to a multi-degree-of-freedom motion mechanism, and more particularly to optical sensing apparatuses, method, and optical detecting module which are capable of estimating multi-degree-of-freedom motion.

2. Description of the Prior Art

Generally speaking, a conventional tracking solution such as optical mouse typically tracks only two degrees of freedom motion (translations along X-axis and Y-axis). This may be expanded to track rotational motion in the X-Y plane (i.e. along the Z-axis) for a three-degree-of-freedom (3-DOF) motion estimation system. Further, another conventional tracking solution may also include depth sensing via a time-of-flight or structured light operation/system. With this additional depth sensing, translational motion along the Z-axis and rotational motions along X-axis and Y-axis can be tracked. However, the above-mentioned conventional systems are very complicated for implementation since it is necessary to different and very complex processing methodology or algorithm for the translational, rotation and depth sensing respectively.

Another conventional tracking solution may utilize stereoscopic imaging to detect six-degree-of-freedom (6-DOF) motion. However such tracking solution inevitably requires two image sensors with a significant positional separation to work well, in addition to requiring complex imaging processing and comparison.

Further, another conventional tracking solution utilizes object detection and tracking to detect 6-DOF of freedom. For the solution, an object is identified and its motion is tracked. In addition to the complex computation required, the solution is also susceptible to loss of tracking when the object moves out of the field of view of the sensor.

SUMMARY OF THE INVENTION

Therefore one of the objectives of the invention is to provide optical sensing apparatuses, method, and optical detecting module, to solve the above-mentioned problems.

According to embodiments of the invention, an optical sensing apparatus capable of estimating multi-degree-of-freedom motion is disclosed. The optical sensing apparatus comprises a lens, a processor, and an image sensor having a pixel array having a plurality of image zones. The image sensor is configured for sensing and capturing a frame. The lens is configured for varying optical magnifications of a plurality of portion images of the frame to generate a plurality of reconstructed images with different of field of views wherein the portion images of the frame respectively correspond to the image zones. The processor is coupled to the lens and configured for estimating and obtaining a motion result for each of the reconstructed images to estimate the motion of the optical sensing apparatus.

According to the embodiments, a method capable of estimating multi-degree-of-freedom motion of an optical sensing apparatus is disclosed. The method comprises: providing an image sensor having a pixel array having a plurality of image zones to sense and capture a frame; providing and using a lens to vary optical magnifications of a plurality of portion images of the frame to generate a plurality of reconstructed images with different of field of views, the portion images of the frame respectively corresponding to the image zones; and estimating and obtaining a motion result for each of the reconstructed images to estimate the multi-degree-of-freedom motion of the optical sensing apparatus.

According to the embodiments, an optical sensing apparatus capable of estimating multi-degree-of-freedom motion is disclosed. The optical sensing apparatus comprises an optical detecting module and a processor. The optical detecting module is configured for capturing a plurality of frames, wherein each frame includes a plurality of sub-images and at least two sub-images in each frame having different directions in their major axes. The processor is coupled to the optical detecting module and configured for obtaining a motion of the optical detecting module based on variations of the at least two sub-images in two frames.

According to the embodiments, an optical detecting module for capturing image frames in a multi-degree-of-freedom motion device is disclosed. The multi-degree-of-freedom motion device is used to estimate a motion based on the captured image frames. The optical detecting module comprises an image array wherein the image array is divided to at least two block to obtain two sub-images in one captured frame and the at least two blocks having different directions in their major axes.

According to the embodiments, compared to the conventional tracking solutions, the invention is potentially both more compact and less computationally intensive than the conventional tracking solutions. In the embodiments, a multi-zone scene processing with a single type of processing engine is used to compute motion in six-degree-of-freedom motion. The advantage or distinguishing feature of this invention includes: less complex implementation or computation as it only uses cross-correlation to detect all 6-DOF motion. Also, it is not susceptible to objects moving out of the field of view as it tracks the overall scene and not specific objects. Also, it is more compact as it does not require significant separation of image sensors. Also, it is more cost effective as it require only a simple hardware/opto-mechanical configuration.

These and other objectives of the present invention will no doubt become obvious to those of ordinary skill in the art after reading the following detailed description of the preferred embodiment that is illustrated in the various figures and drawings.

DETAILED DESCRIPTION

The invention is to provide a method for tracking multi-degree-of-freedom motion of an object. For example, the invention is to track six-degrees-of-freedom motion, i.e. translation motions along X-axis, Y-axis, and Z-axis as well as rotations along the X-axis, Y-axis, and Z-axis.

Figure 1:
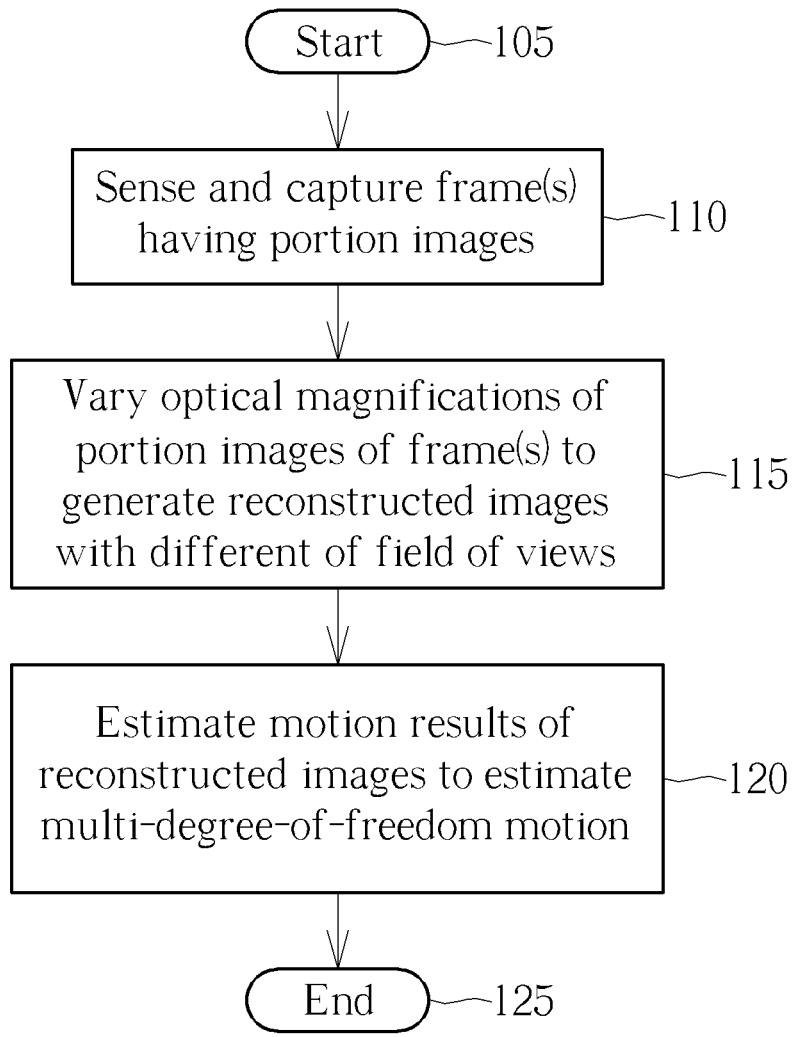
FIG. 1 is a diagram illustrating a flowchart of a method capable of estimating multi-degree-of-freedom motion of an optical sensing apparatus according to embodiments of the invention.
Figure 2:
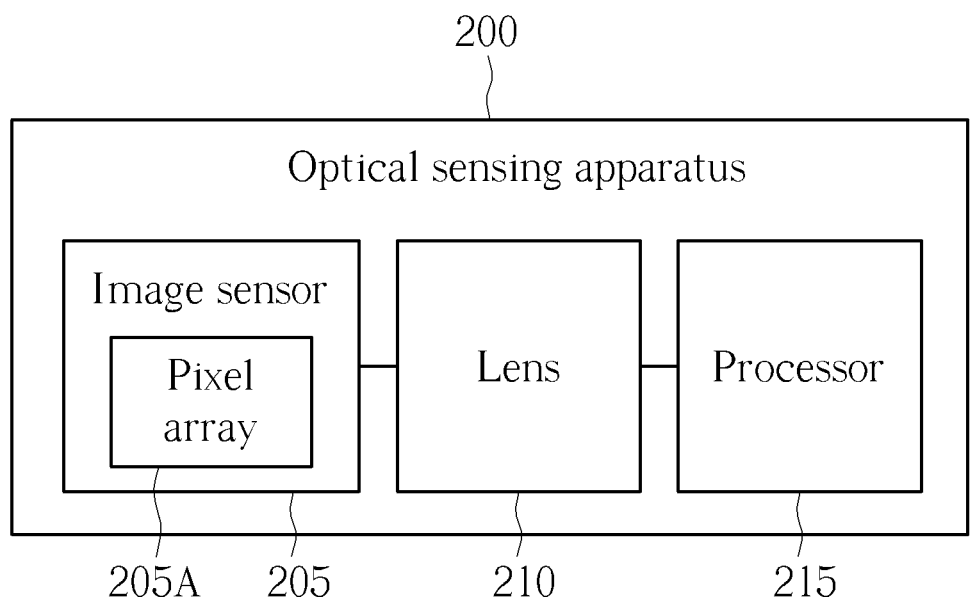
FIG. 2 is a block diagram of an example of the optical sensing apparatus.

Refer to FIG. 1 in conjunction with FIG. 2. FIG. 1 is a diagram illustrating a flowchart of a method capable of estimating multi-degree-of-freedom motion of an optical sensing apparatus according to embodiments of the invention. The method is applied to the optical sensing apparatus such as a wearable electronic device which is for example a head-mounted device (e.g. a virtual reality (VR) head-mounted display device (but not limited)). In another embodiment, the optical sensing apparatus can be an Unmanned Aerial Vehicle (UAV) device or an Unmanned Aircraft System (UAS) device. FIG. 2 is a block diagram of an example of the optical sensing apparatus 200. Provided that substantially the same result is achieved, the steps of the flowchart shown in FIG. 1 need not be in the exact order shown and need not be contiguous, that is, other steps can be intermediate. Steps are detailed in the following:

Step 105: Start;

Step 110: use optical sensing apparatus 200 to sense and capture frame(s) having a plurality of portion images;

Step 115: vary optical magnifications of portion images of the frame(s) to generate a plurality of reconstructed images with different of field of views;

Step 120: estimate motion results for the reconstructed images to estimate the multi-degree-of-freedom motion of the optical sensing apparatus 200; and Step 125: End.

The multi-degree-of-freedom motion for example is six-degrees-of-freedom (6-DOF) motion or three-degrees-of-freedom (3-DOF) motion; this is not meant to be a limitation. For example, the apparatus 200 can be arranged to detect or sense the movements, rotations and other types of motions of the apparatus 200 respectively along major axes. In practice, the optical sensing apparatus 200 implemented with the above method is capable of estimating 6-DOF motion, and comprises an image sensor 205 having a pixel array 205A, a lens 210, and a processor 215.

Figure 3:
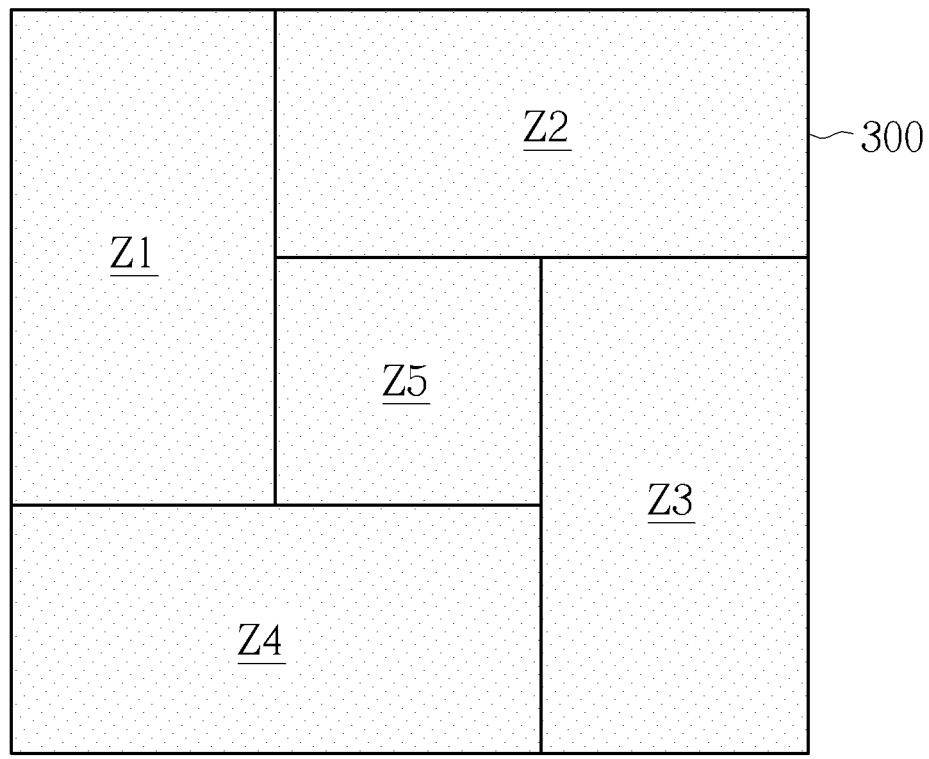
FIG. 3 is a diagram showing an example of the pixel array of FIG. 2 with five image zones.

The pixel array 205A has a plurality of image zones each having sensing pixel units and is configured for sensing and capturing frame(s). For example, in a preferred embodiment, the sensing pixels of pixel array 205A are respectively classified into or grouped as five image zones Z1-Z5 shown in FIG. 3. FIG. 3 is a diagram showing an example of the pixel array 205A with five image zones Z1-Z5. Within the pixel region 300 of pixel array substrate, Z5 indicates a center square zone and Z1-Z4 indicate different rectangular zones such as top left image zone Z1, top right image zone Z2, bottom left image zone Z4, and bottom right image zone Z3.

Figure 4:
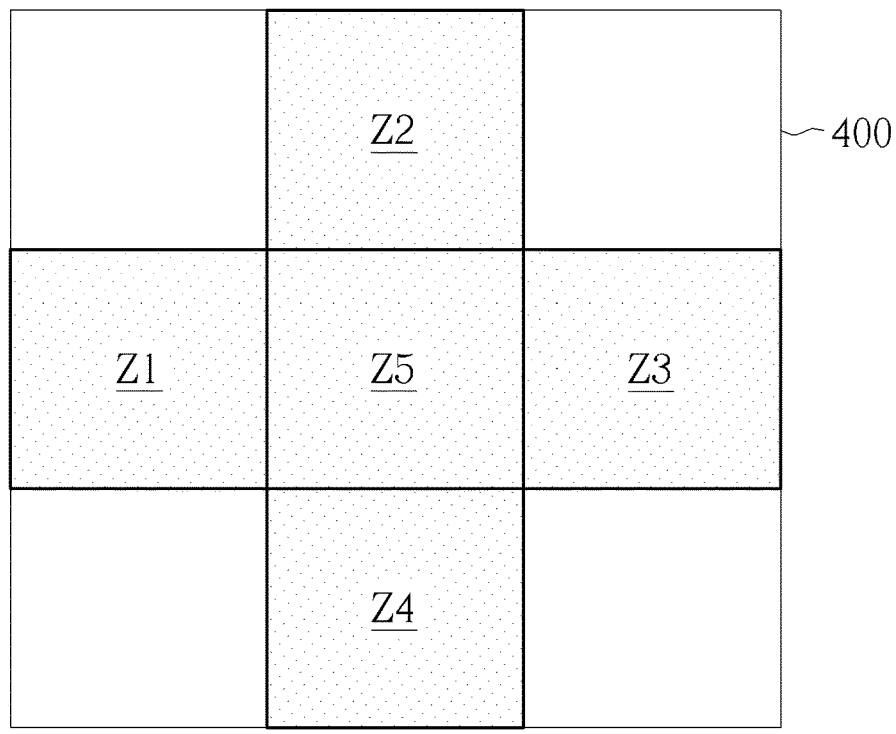
FIG. 4 is a diagram showing another example of the pixel array of FIG. 2 with five image zones.

Alternatively, in another example, the pixel array 205A may be designed to have five image zones as shown in FIG. 4. FIG. 4 is a diagram showing another example of the pixel array 205A with five image zones Z1-Z5. Within the pixel region 400 of pixel array substrate, each of five image zones Z1-Z5 is a square zone placed in different positions as shown in FIG. 4. That is, the image zones have a center image zone and a plurality of peripheral image zones such as four image zones (but not limited).

Figure 5:
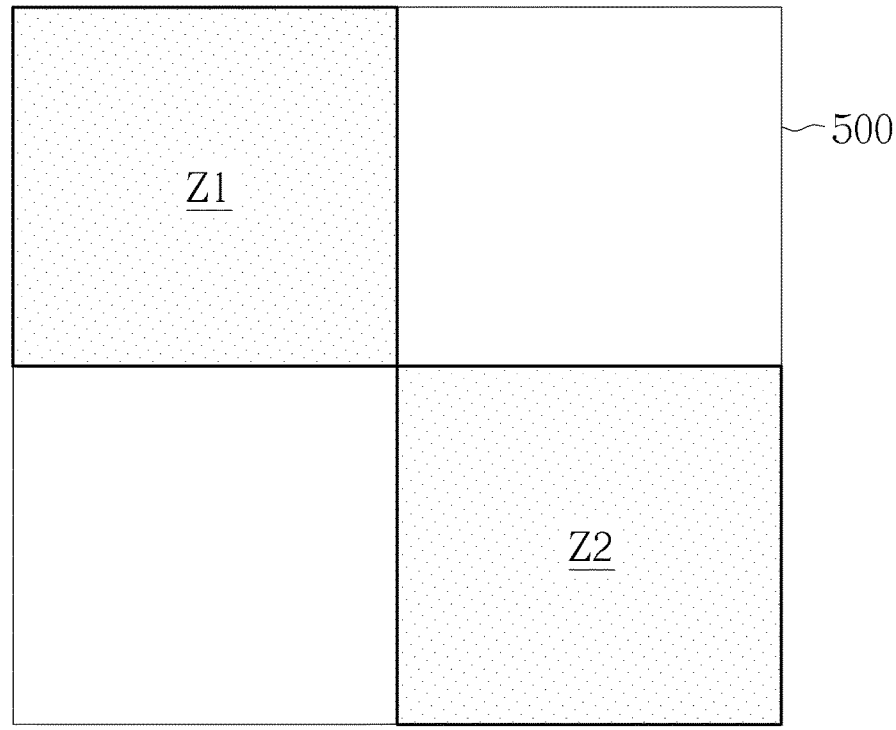
FIG. 5 is a diagram showing an example of the pixel array of FIG. 2 with two image zones.

Alternatively, in another example, the pixel array 205A may be designed to have five image zones as shown in FIG. 5. FIG. 5 is a diagram showing another example of the pixel array 205A with two image zones Z1-Z2. Within the pixel region 500 of pixel array substrate, the two image zones Z1 and Z2 are square zones such as top left image zone Z1 and bottom right image zone Z2 (but not limited). In the above embodiments, the image zones have at least two image zones selected from a top left image zone, a top right image zone, a bottom left image zone, and a bottom right image zone within the frame.

Figure 6:
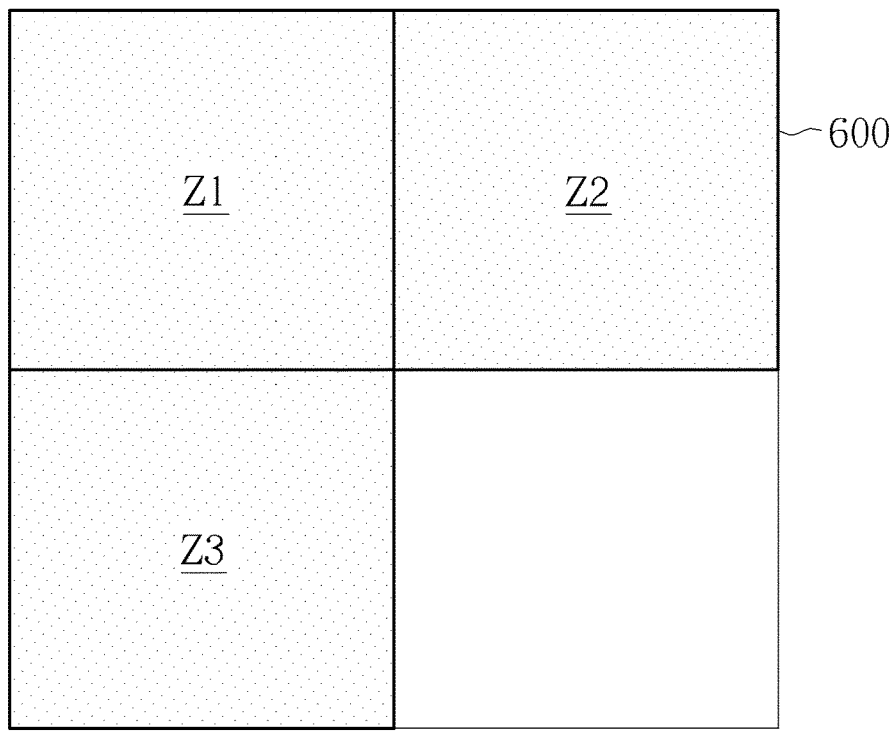
FIG. 6 is a diagram showing an example of the pixel array of FIG. 2 with three image zones.

Alternatively, in another example, the pixel array 205A may be designed to have three image zones as shown in FIG. 6. FIG. 6 is a diagram showing another example of the pixel array 205A with three image zones Z1-Z3. Within the pixel region 600 of pixel array substrate, the three image zones Z1-Z3 are square zones such as top left image zone Z1, top right image zone Z2, and bottom left image zone Z3.

Figure 7:
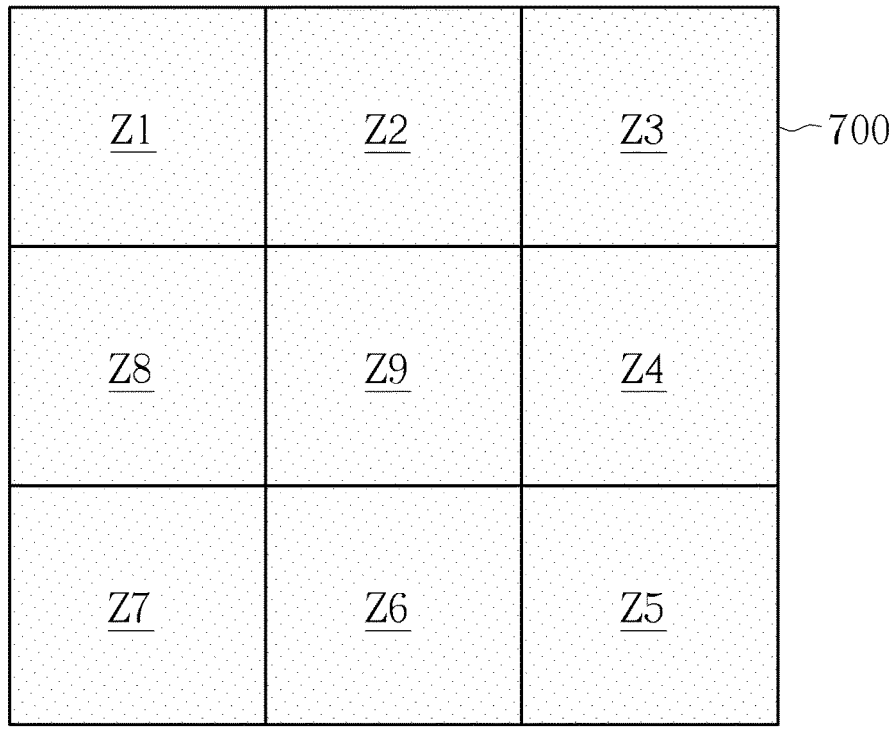
FIG. 7 is a diagram showing an example of the pixel array of FIG. 2 with nine image zones.

Alternatively, in another example, the sensing pixels of pixel array 205A are respectively classified into or grouped as nine image zones as shown in FIG. 7. FIG. 7 is a diagram showing an example of the pixel array 205A with nine zones Z1-Z9. Within the pixel region 700 of pixel array substrate, the nine zones Z1-Z9 are square image zones forming a style box as shown in FIG. 7. As mentioned in the above examples, the pixel array 205A is configured to have at least two image zones, and the at least two image zones may be with different sizes and/or different shapes.

The above-mentioned image zones such as Z1-Z5 of FIG. 3 respectively correspond to the five portion images of the frame. In Step 115, for generating each captured frame, the lens 210 is configured for varying optical magnifications of a plurality of portion images of the frame to generate a plurality of reconstructed images with different of field of views, and the portion images of the frame are respectively associated with the image zones. In practice, the lens 210 can be used with a fish-eye type lens with barrel distortion to vary the optical magnifications of the portion images of the frame.

Figure 8:
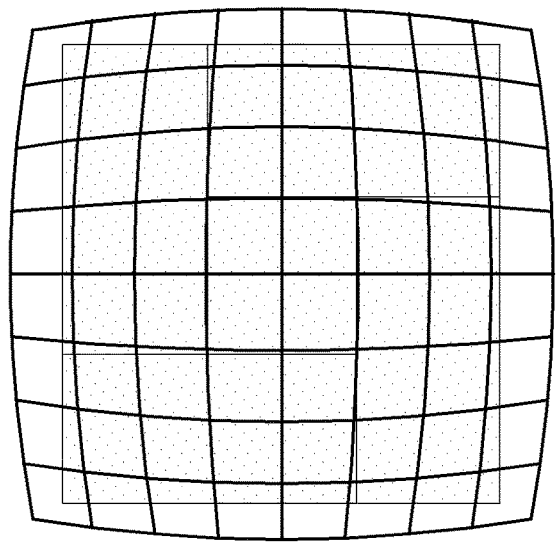
FIG. 8 is a diagram showing an example of using the fish-eye type lens to vary the optical magnifications of five portion images respectively corresponding to the image zones Z1-Z5 of FIG. 3.
Figure 8:
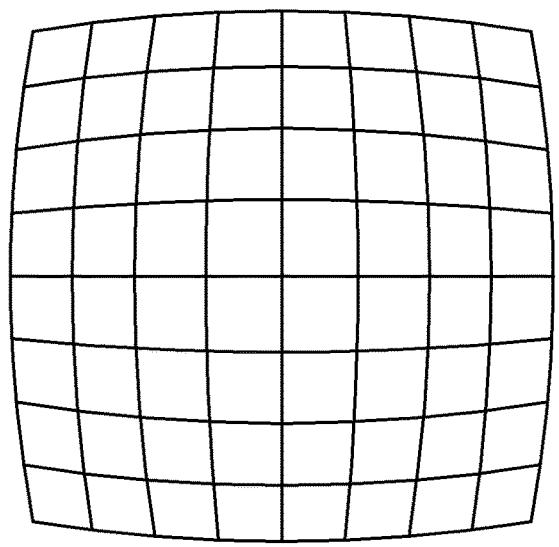
Figure 8:
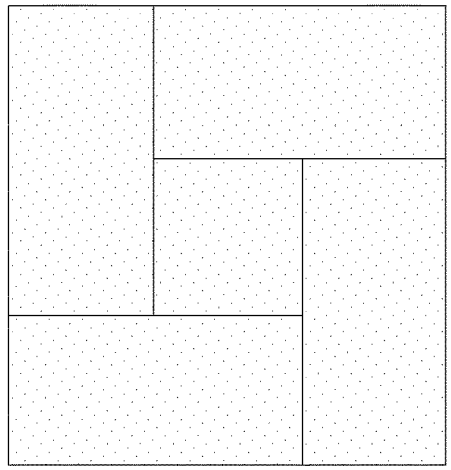

FIG. 8 is a diagram showing an example of using the fish-eye type lens to vary the optical magnifications of five portion images respectively corresponding to the image zones Z1-Z5 of FIG. 3. As shown in FIG. 8, the images at the five image zones Z1-Z5 are respectively processed by the fish-eye type lens with different optical magnifications to generate the corresponding reconstructed images with different of field of views, to simulate three-dimensional images seen at the view of the apparatus 200. It should be noted that the lens 210 can be used with other types of lens and/or can be optional. In addition, in another embodiment, the lens 210 may be implemented by using multiple sub-lens units.

In Step 120, the processor 215, coupled to the lens 210, is configured for estimating and obtaining a motion result of each of the reconstructed images to estimate the 6-DOF motion of the optical sensing apparatus 200. The reconstructed images respectively correspond to a plurality of motion directions, and the processor 215 can generate the motion of the optical sensing apparatus according to at least one motion direction associated with at least one reconstructed image. Specifically, for the example of 6-DOF motion, the processor 215 is arranged for preliminarily classifying the 6-DOF motion of the optical sensing apparatus into a particular motion type (or movement pattern) by referring to motion results (motion directions and/or motion magnitudes of motion vectors) of all the reconstructed images as shown in FIG. 8, and then for estimating the 6-DOF motion based on the motion results by referring to the particular motion type. The processor 215 is arranged for deciding the particular motion type by referring to motion direction(s) and/or motion magnitudes associated with the motion results of all the reconstructed images. In addition, corresponding motion direction and motion vector of each reconstructed image can be calculated or estimated by using the optical flow detection mechanism.

For example, the optical sensing apparatus 200 is capable of monitoring or detecting/sensing the movement or motion of a user's head by sensing to generate reconstructed frames and detecting motion of the reconstructed frames to detect movement or motion (e.g. 6-DOF motion) of optical sensing apparatus 200 when the user wears optical sensing apparatus 200 at his/her head. Specifically, for the example of five image zones Z1-Z5 of FIG. 3, the lens 210 generates the reconstructed images respectively corresponding to the five image zones Z1-Z5, and the processor 210 is arranged to detect the movement or motion of each of the five reconstructed images to generate five motion results (motion vectors) respectively. It should be noted that the number of motion results of reconstructed images depends on the number of image zones and is not intended to be a limitation; in other example, if the number of image zones is equal to nine (i.e. a style box as shown in FIG. 7), the number of motion results of reconstructed images is equal to nine.

In an embodiment, the processor 215 is arranged to preliminarily classify the 6-DOF motion of the optical sensing apparatus into a particular motion type (or movement pattern) by referring to the motion directions/magnitudes of the multiple motion results of reconstructed images. After deciding the particular motion type by referring to a plurality of motion directions/magnitudes associated with the motion results of all the reconstructed images, the processor 215 is arranged to precisely calculate the 6-DOF motion of optical sensing apparatus 200 by referring to the particular motion type and the motion results. In other embodiments, the processor 215 may be arranged to precisely calculate the 6-DOF motion of optical sensing apparatus 200 based on the motion results without preliminarily classifying the 6-DOF motion of the optical sensing apparatus 200 into a particular motion type.

It should be noted that the particular motion type in 6-DOF motion means at least one movement among left movement, right movement, up movement, down movement, roll movement, yaw movement, and pitch movement, and/or any combinations; however, this is not intended to be a limitation.

Figure 9:
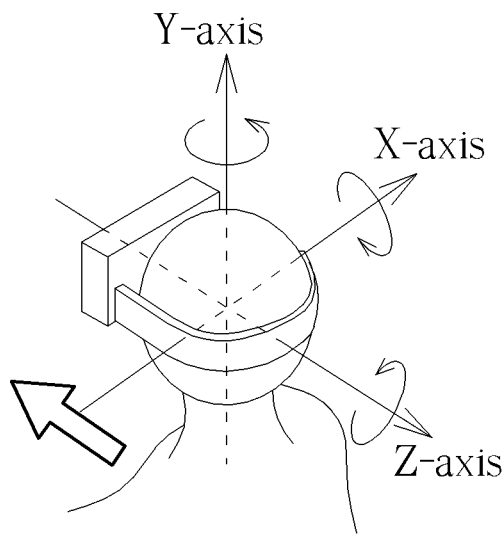
FIG. 9 shows an example of the relation between the overall estimated motion type (movement pattern) and the movement/motion of the user's head when the user is operating the optical sensing apparatus (head-mounted device).

FIG. 9 shows an example of the relation between the overall estimated motion type (movement pattern) and the movement/motion of the user's head when the user is operating the optical sensing apparatus (head-mounted device); in this example and following examples, the optical sensing apparatus 200 may be placed on the forehead of the user. This, however, is not intended to be a limitation. As shown in FIG. 9, the processor 215 may detect/decide that the images at image zones Z1-Z4 have different moving directions (left, up, right, and down) with substantially identical movement magnitudes respectively and the image at image zone Z5 has no motions (no moving directions), and then the processor 215 can determine that the user' head is moving forward correspondingly. For example, the processor 215 may derive/calculate the motions of images at image zones Z1-Z5 to obtain the motion results (dx1-dx5 and dy1-dy5) which can be represented by the following equations:

$$dx1=(rz2-rz1)\times\tan(\alpha 2); \; dy1=0;$$

$$dx2=0; \; dy2=(rz2-rz1)\times\tan(\alpha 2);$$

$$dx3=(rz2-rz1)\times\tan(\alpha 2); \; dy3=0;$$

$$dx4=0; \; dy4=(rz2-rz1)\times\tan(\alpha 2);$$

$$dx5=0; \; dy5=0;$$

wherein dx1 and dy1, i.e. the X-axis component and Y-axis component of motion vector, indicate moving directions and movement magnitudes of the image at image zone Z1; dx2 and dy2, i.e. the X-axis component and Y-axis component of motion vector, indicate moving directions and movement magnitudes of the image at image zone Z2; dx3 and dy3, i.e. the X-axis component and Y-axis component of motion vector, indicate moving directions and movement magnitudes of the image at image zone Z3; dx4 and dy4, i.e. the X-axis component and Y-axis component of motion vector, indicate moving directions and movement magnitudes of the image at image zone Z4; dx5 and dy5, i.e. the X-axis component and Y-axis component of motion vector, indicate moving directions and movement magnitudes of the image at image zone Z5; $\alpha 2$ indicate the viewing cone angle for image zone Z5; rz1 and rz2 are real or actual motion/movement parameters of the 6-DOF motion to be estimated wherein the device 200 actually moves the position value rz1 to the position value rz2 along the Z-axis and for example the value of rz1 is greater than the value of rz2.

This example shows that the images at image zones Z1-Z4 have different moving directions (left, up, right, and down) with substantially identical movement magnitudes respectively and the image at image zone Z5 has no motions (no moving directions). Accordingly, if detecting this, the processor 215 can determine that the user' head is moving forward correspondingly and then classify the motion type of 6-DOF motion as a forward motion type or a forward movement pattern. The processor 215 is arranged to calculate or derive the values of rz1 and rz2 based on the above equation(s) and the values of dx1-dx5 and dy1-dy5 and viewing cone angle $\alpha 2$. After calculating the values of rz1 and rz2, the processor 215 can estimate the forward distance of 6-DOF motion to obtain an accurate 6-DOF motion result of optical sensing apparatus 200.

In addition, in another embodiment, the processor 215 can be arranged to determine the user's action/behavior state such as moving forward/backward, jumping, squatting down, or rotating, and so on according to motion directions calculated based on all image zones without deriving actual movements or actual motion magnitudes. Further, the processor 215 may be arranged to further refer to actual movements or actual motion magnitudes to auxiliarily decide the user's action/behavior state. For example, the processor 215 may be arranged to derive actual movements or actual motion magnitudes of the above-mentioned image zones.

Figure 10:
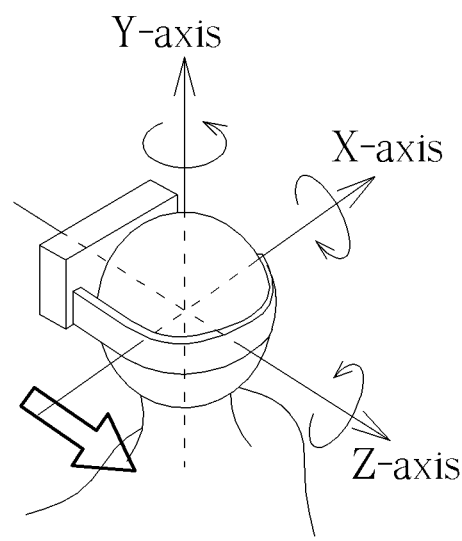
FIG. 10 shows another example of the relation between the overall estimated motion type (movement pattern) and the movement/motion of the user's head when the user is operating the optical sensing apparatus (head-mounted device).

In addition, FIG. 10 shows another example of the relation between the overall estimated motion type (movement pattern) and the movement/motion of the user's head when the user is operating the optical sensing apparatus (head-mounted device). As shown in FIG. 10, the processor 215 may detect/decide that the images at image zones Z1-Z4 have different moving directions (right, down, left, and up) with substantially identical movement magnitudes respectively and the image at image zone Z5 has no motions (no moving directions), and then the processor 215 can determine that the user' head is moving backward correspondingly. For example, the processor 215 may derive/calculate the motions of images at image zones Z1-Z5 to obtain the motion results which can be represented by the following equations:

$$dx1=(rz2-rz1)\times\tan(\alpha 2); \; dy1=0;$$

$$dx2=0; \; dy2=(rz2-rz1)\times\tan(\alpha 2);$$

$$dx3=(rz2-rz1)\times\tan(\alpha 2); \; dy3=0;$$

$$dx4=0; \; dy4=(rz2-rz1)\times\tan(\alpha 2);$$

$$dx5=0; \; dy5=0;$$

This example shows that the images at image zones Z1-Z4 have different moving directions (right, down, left, and up) with substantially identical movement magnitudes respectively and the image at image zone Z5 has no motions (no moving directions). Accordingly, if detecting this, the processor 215 can determine that the user' head is moving backward correspondingly and then classify the motion type of 6-DOF motion as a backward motion type or a backward movement pattern. The processor 215 is arranged to calculate or derive the values of rz1 and rz2 based on the above equation(s) and the values of dx1-dx5 and dy1-dy5 and viewing cone angle $\alpha 2$. After calculating the values of rz1 and rz2, the processor 215 can estimate the backward distance of 6-DOF motion to obtain an accurate 6-DOF motion result of optical sensing apparatus 200.

Figure 11:
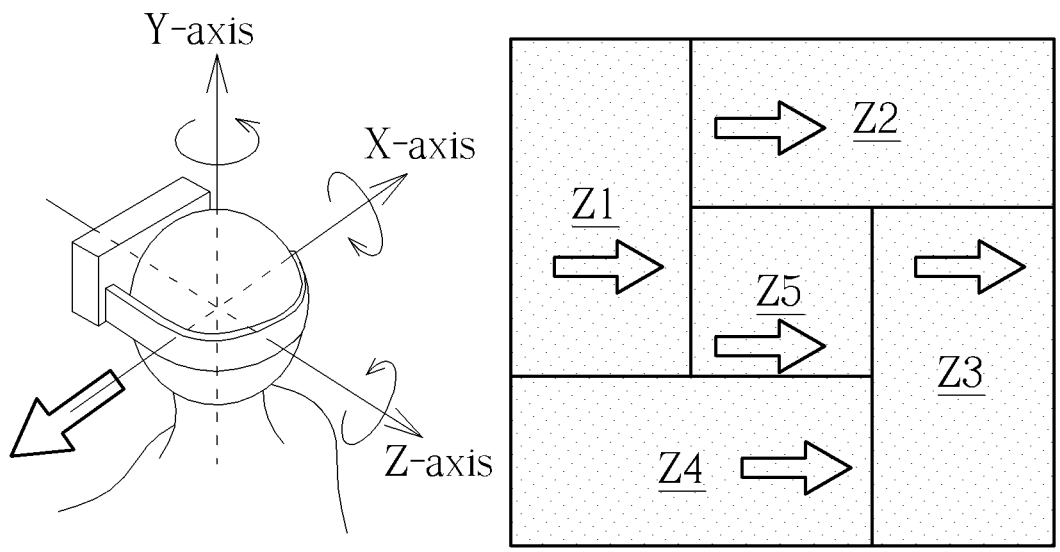
FIG. 11 shows another example of the relation between the overall estimated motion type (movement pattern) and the movement/motion of the user's head when the user is operating the optical sensing apparatus (head-mounted device).

FIG. 11 shows another example of the relation between the overall estimated motion type (movement pattern) and the movement/motion of the user's head when the user is operating the optical sensing apparatus (head-mounted device). As shown in FIG. 11, the processor 215 may detect/decide that the images at image zones Z1-Z5 have the same moving direction (moving right), and then the processor 215 can determine that the user' head is moving left correspondingly. For example, the processor 215 may derive/calculate the motions of images at image zones Z1-Z5 to obtain the motion results which can be represented by the following equations:

$$dx1=(x2-x1)\times M2; \; dy1=0;$$

$$dx2=(x2-x1)\times M2; \; dy2=0;$$

$$dx3=(x2-x1)\times M2; \; dy3=0;$$

$$dx4=(x2-x1)\times M2; \; dy4=0;$$

$$dx5=(x2-x1)\times M1; \; dy5=0;$$

wherein M1 indicates the optical magnification of the lens 210 with an object at a distance for image zone Z5 and M2 indicates the optical magnification of the lens 210 with an object at the distance for image zones Z1-Z4. The value of M1 is greater than that of M2 since of the barrel distortion of fish-eye but this can be varied. The values of x1 and x2 are real or actual motion/movement parameters of the 6-DOF motion to be estimated wherein the device 200 actually moves the position value x1 to the position value x2 along the X-axis and for example the value of x1 is greater than the value of x2.

This example shows that the images at image zones Z1-Z5 have the same moving direction (right). Accordingly, if detecting this, the processor 215 can determine that the user' head is moving left correspondingly and then classify the motion type of 6-DOF motion as a left motion type or left movement pattern. The processor 215 is arranged to calculate or derive the values of x1 and x2 based on the above equation(s) and the values of dx1-dx5 and dy1-dy5. After calculating the values of x1 and x2, the processor 215 can estimate the moving distance of 6-DOF motion to obtain an accurate 6-DOF motion result of optical sensing apparatus 200.

Figure 12:
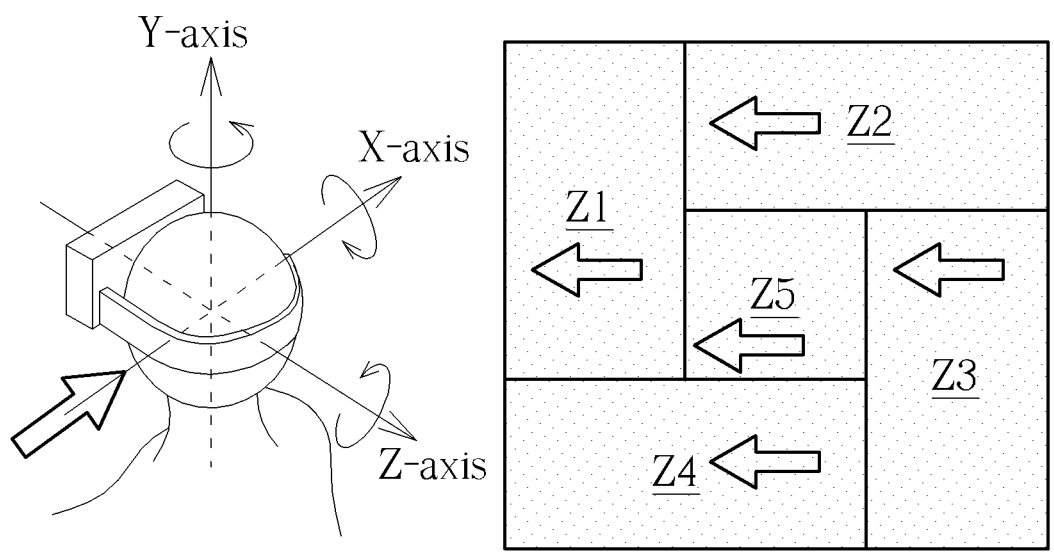
FIG. 12 shows another example of the relation between the overall estimated motion type (movement pattern) and the movement/motion of the user's head when the user is operating the optical sensing apparatus (head-mounted device).

FIG. 12 shows another example of the relation between the overall estimated motion type (movement pattern) and the movement/motion of the user's head when the user is operating the optical sensing apparatus (head-mounted device). As shown in FIG. 12, the processor 215 may detect/decide that the images at image zones Z1-Z5 have the same moving direction (moving left), and the processor 215 can determine that the user' head is moving right correspondingly. For example, the processor 215 may derive/calculate the motions of images at image zones Z1-Z5 to obtain the motion results which can be represented by the following equations:

$$dx1=(x2-x1)\times M2;\ dy1=0;$$

$$dx2=(x2-x1)\times M2;\ dy2=0;$$

$$dx3=(x2-x1)\times M2;\ dy3=0;$$

$$dx4=(x2-x1)\times M2;\ dy4=0;$$

$$dx5=(x2-x1)\times M1;\ dy5=0;$$

This example shows that the images at image zones Z1-Z5 have the same moving direction (left). Accordingly, if detecting this, the processor 215 can determine that the user' head is moving right correspondingly and then classify the motion type of 6-DOF motion as a right motion type or right movement pattern. The processor 215 is arranged to calculate or derive the values of x1 and x2 based on the above equation(s) and the values of dx1-dx5 and dy1-dy5. After calculating the values of x1 and x2, the processor 215 can estimate the moving distance of 6-DOF motion to obtain an accurate 6-DOF motion result of optical sensing apparatus 200.

Figure 13:
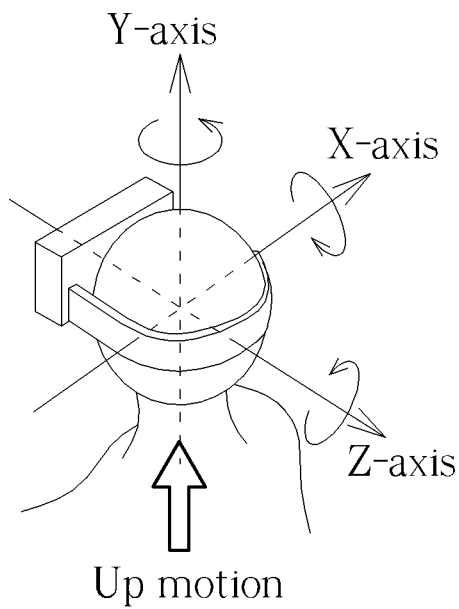
FIG. 13 shows another example of the relation between the overall estimated motion type (movement pattern) and the movement/motion of the user's head when the user is operating the optical sensing apparatus (head-mounted device).
Figure 13:
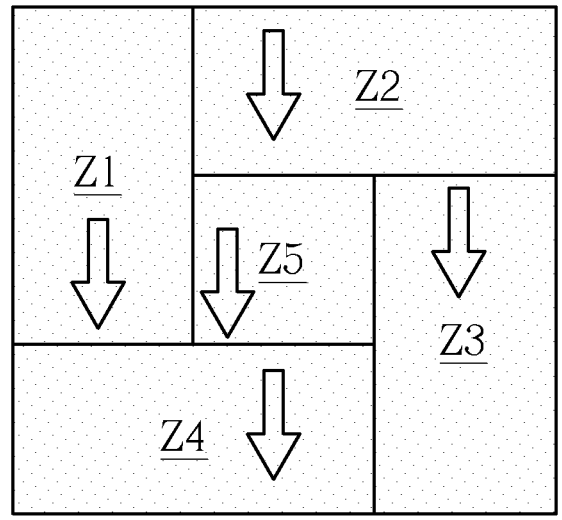
Figure 14:
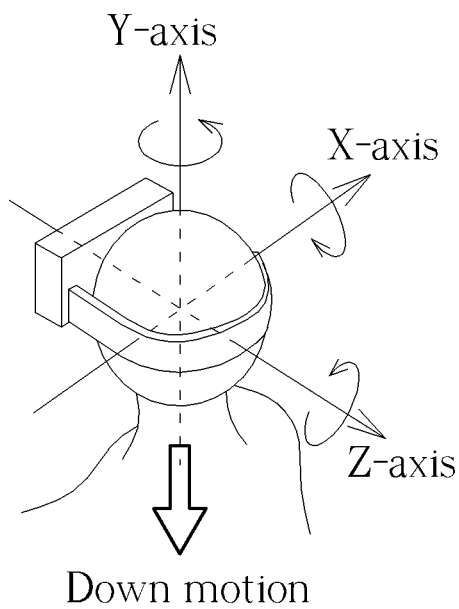
FIG. 14 shows another example of the relation between the overall estimated motion type (movement pattern) and the movement/motion of the user's head when the user is operating the optical sensing apparatus (head-mounted device).
Figure 14:
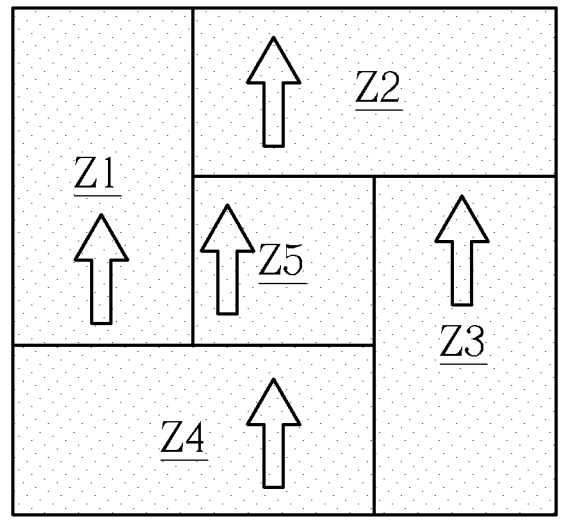

FIG. 13 and FIG. 14 respectively show other examples of the relation between the overall estimated motion type (movement pattern) and the movement/motion of the user's head when the user is operating the optical sensing apparatus (head-mounted device). As shown in FIG. 13, the processor 215 may detect/decide that the images at image zones Z1-Z5 have the same moving direction (moving down), and the processor 215 can determine that the user' head is moving up correspondingly. This example shows that the images at image zones Z1-Z5 have the same moving direction (down). Accordingly, if detecting this, the processor 215 can determine that the user' head is moving up correspondingly and then classify the motion type of 6-DOF motion as an up motion type or up movement pattern. The processor 215 is arranged to calculate or derive corresponding real motion parameters based on the estimated motion type and motion/movement magnitudes. Finally, the processor 215 can estimate the moving distance and direction of 6-DOF motion to obtain an accurate 6-DOF motion result of optical sensing apparatus 200.

As shown in FIG. 14, the processor 215 may detect/decide that the images at image zones Z1-Z5 have the same moving direction (moving up), and the processor 215 can determine that the user' head is moving down correspondingly. This example shows that the images at image zones Z1-Z5 have the same moving direction (up). Accordingly, if detecting this, the processor 215 can determine that the user' head is moving down correspondingly and then classify the motion type of 6-DOF motion as a down motion type or a down movement pattern. The processor 215 is arranged to calculate or derive corresponding real motion parameters based on the estimated motion type and motion/movement magnitudes. Finally, the processor 215 can estimate the moving distance and direction of 6-DOF motion to obtain an accurate 6-DOF motion result of optical sensing apparatus 200.

Figure 15:
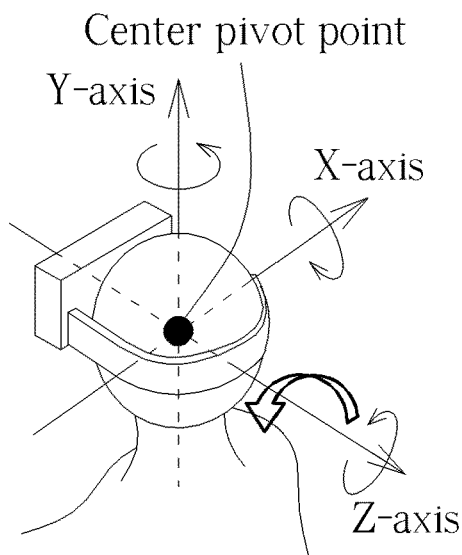
FIG. 15 shows another example of the relation between the overall estimated motion type (movement pattern) and the movement/motion of the user's head when the user is operating the optical sensing apparatus (head-mounted device).
Figure 15:
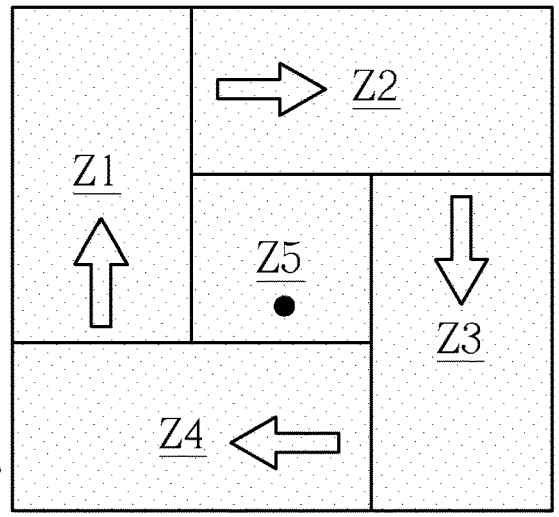

FIG. 15 shows another example of the relation between the overall estimated motion type (movement pattern) and the movement/motion of the user's head when the user is operating the optical sensing apparatus (head-mounted device). As shown in FIG. 15, the processor 215 may detect/decide that the images at image zones Z1-Z4 have different moving directions (respectively moving up, right, down, and left) and the image at image zone Z5 has no motions (no moving direction), and the processor 215 can determine that the user' head has a positive roll motion correspondingly. This example shows that the images at image zones Z1-Z4 have different moving directions (respectively moving up, right, down, and left) and the image at image zone Z5 has no motions (no moving direction). Accordingly, if detecting this, the processor 215 can determine that the user' head has a positive roll motion correspondingly and then classify the motion type of 6-DOF motion as a positive roll motion type or positive roll movement pattern. The processor 215 is arranged to calculate or derive real motion parameters based on the estimated positive roll motion type, moving directions/vectors of images at the image zones Z1-Z5. After calculating the real motion parameters, the processor 215 can estimate to obtain an accurate 6-DOF motion result of optical sensing apparatus 200.

Figure 16:
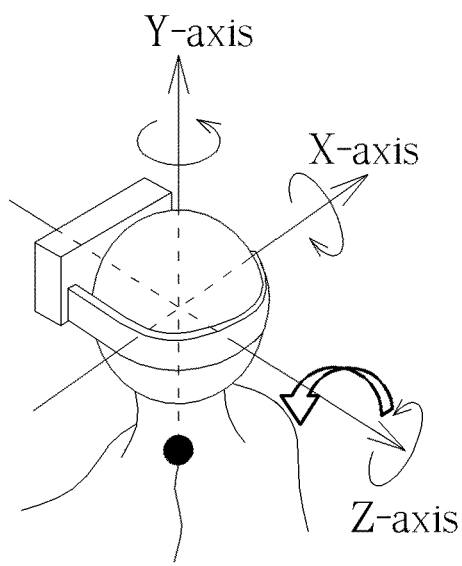
FIG. 16 shows another example of the relation between the overall estimated motion type (movement pattern) and the movement/motion of the user's head when the user is operating the optical sensing apparatus (head-mounted device).
Figure 16:
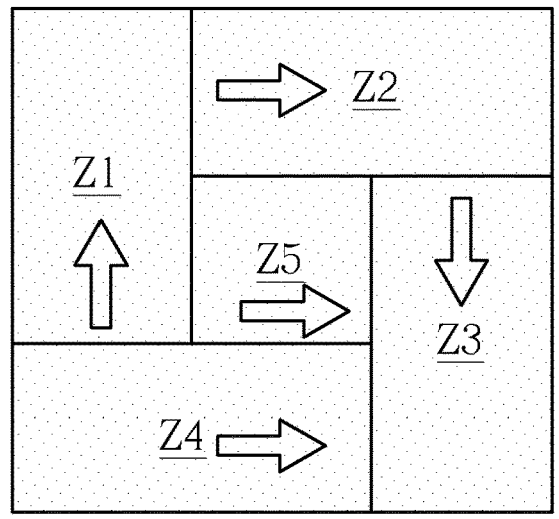

FIG. 16 shows another example of the relation between the overall estimated motion type (movement pattern) and the movement/motion of the user's head when the user is operating the optical sensing apparatus (head-mounted device). As shown in FIG. 16, the processor 215 may detect/decide that the images at image zones Z1-Z4 have different moving directions (respectively moving up, right, down, and right) and the image at image zone Z5 is with a moving right direction, and the processor 215 can determine that the user' head has a positive roll motion with an offset pivot point at Y-axis correspondingly. This example shows that the images at image zones Z1-Z4 have different moving directions (respectively moving up, right, down, and right) and the image at image zone Z5 is with a moving right direction. Accordingly, if detecting this, the processor 215 can determine that the user' head has a positive roll motion with an offset pivot point at Y-axis correspondingly and then classify the motion type of 6-DOF motion as a positive roll motion type (movement pattern) with an offset pivot point at Y-axis. The processor 215 is arranged to calculate or derive real motion parameters based on the estimated motion type, moving directions/vectors of images at the image zones Z1-Z5. After calculating the real motion parameters, the processor 215 can estimate to obtain an accurate 6-DOF motion result of optical sensing apparatus 200.

Figure 17:
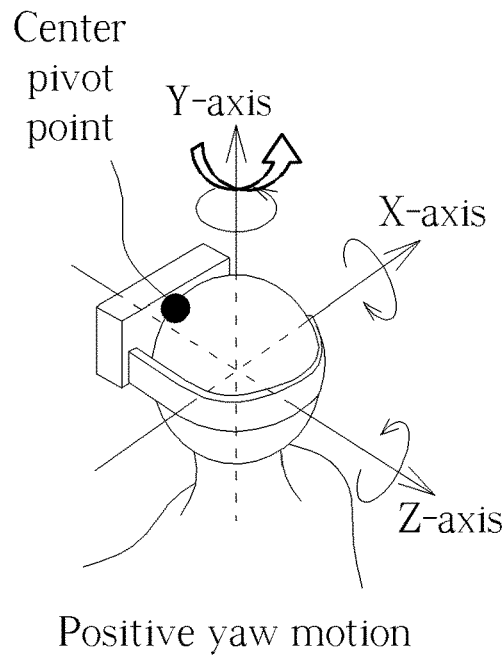
FIG. 17 shows another example of the relation between the overall estimated motion type (movement pattern) and the movement/motion of the user's head when the user is operating the optical sensing apparatus (head-mounted device).
Figure 17:
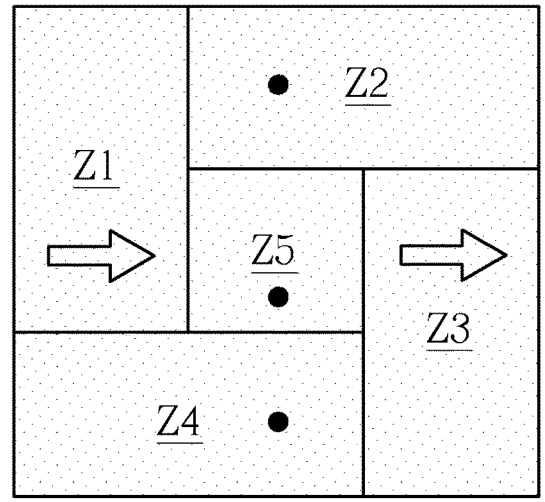

FIG. 17 shows another example of the relation between the overall estimated motion type (movement pattern) and the movement/motion of the user's head when the user is operating the optical sensing apparatus (head-mounted device). As shown in FIG. 17, the processor 215 may detect/decide that the images at image zones Z1 and Z3 have the same moving directions (moving right) and the images at image zones Z1, Z4, Z5 are with no moving directions, and the processor 215 can determine that the user' head has a positive yaw motion correspondingly. This example shows that the images at image zones Z1 and Z3 have the same moving directions (moving right) and the images at image zones Z1, Z4, Z5 have no moving directions. Accordingly, if detecting this, the processor 215 can determine that the user' head has a positive yaw motion correspondingly and then classify the motion type of 6-DOF motion as a positive yaw motion type (movement pattern). The processor 215 is arranged to calculate or derive real motion parameters based on the estimated motion type, moving directions/vectors of images at the image zones Z1-Z5. After calculating the real motion parameters, the processor 215 can estimate to obtain an accurate 6-DOF motion result of optical sensing apparatus 200.

Figure 18:
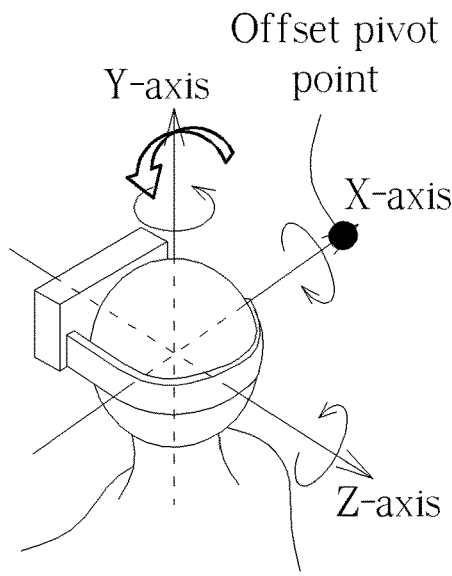
FIG. 18 shows another example of the relation between the overall estimated motion type (movement pattern) and the movement/motion of the user's head when the user is operating the optical sensing apparatus (head-mounted device).
Figure 18:
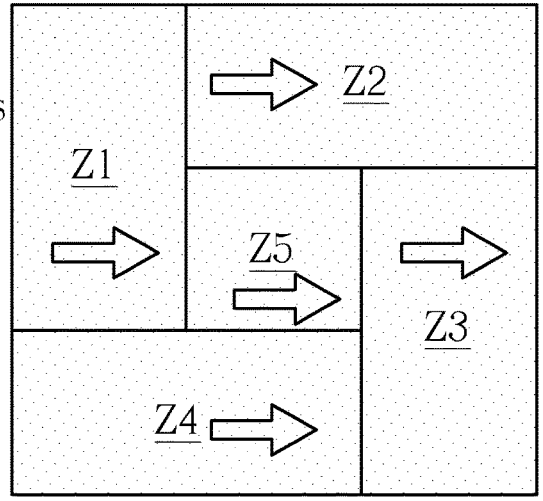

FIG. 18 shows another example of the relation between the overall estimated motion type (movement pattern) and the movement/motion of the user's head when the user is operating the optical sensing apparatus (head-mounted device). As shown in FIG. 18, the processor 215 may detect/decide that the images at image zones Z1 and Z3 have motion vectors with only one moving direction (moving right) and the images at image zones Z2, Z4, Z5 have motion vectors with two-dimensional directions, and the processor 215 can determine that the user' head has a positive yaw motion with an offset pivot point at X-axis correspondingly. This example shows the images at image zones Z1 and Z3 have motion vectors with only one moving direction (moving right) and the images at image zones Z2, Z4, Z5 have motion vectors with two-dimensional directions. Accordingly, if detecting this, the processor 215 can determine that the user' head has a positive yaw motion with an offset pivot point at X-axis correspondingly and then classify the motion type of 6-DOF motion as a positive yaw motion type (movement pattern) with an offset pivot point at X-axis. The processor 215 is arranged to calculate or derive real motion parameters based on the estimated motion type, moving directions/vectors of images at the image zones Z1-Z5. After calculating the real motion parameters, the processor 215 can estimate to obtain an accurate 6-DOF motion result of optical sensing apparatus 200.

Figure 19:
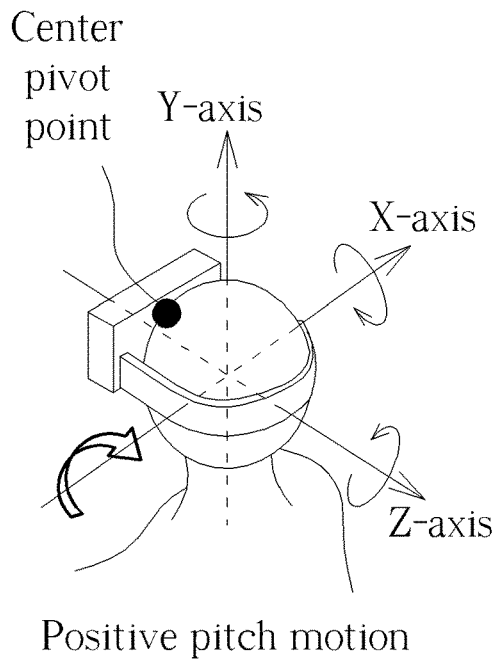
FIG. 19 shows another example of the relation between the overall estimated motion type (movement pattern) and the movement/motion of the user's head when the user is operating the optical sensing apparatus (head-mounted device).
Figure 19:
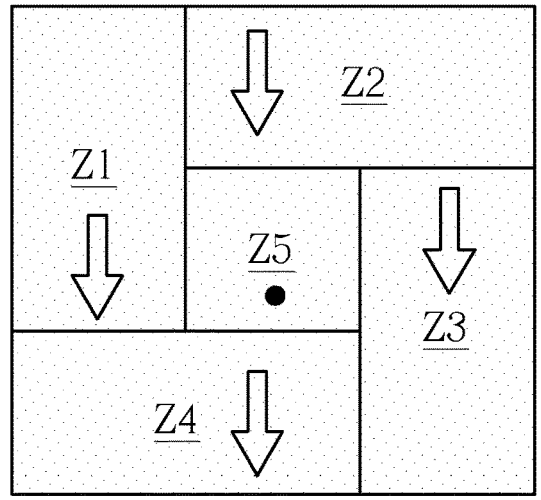

FIG. 19 shows another example of the relation between the overall estimated motion type (movement pattern) and the movement/motion of the user's head when the user is operating the optical sensing apparatus (head-mounted device). As shown in FIG. 19, the processor 215 may detect/decide that the images at image zones Z1-Z4 have substantially identical motion vectors with two-dimensional directions and the image at image zone Z5 have no motions (the motion vector is zero), and the processor 215 can determine that the user' head has a positive pitch motion with a center pivot point correspondingly. This example shows that the images at image zones Z1-Z4 have substantially identical motion vectors with two-dimensional directions and the image at image zone Z5 have no motions. Accordingly, if detecting this, the processor 215 can determine that the user' head has a positive pitch motion with a center pivot point compared to the apparatus 200 correspondingly and then classify the motion type of 6-DOF motion as a positive pitch motion type (movement pattern) with a center pivot point. The processor 215 is arranged to calculate or derive real motion parameters based on the estimated motion type, moving directions, and/or motion vectors of images at the image zones Z1-Z5. After calculating the real motion parameters, the processor 215 can estimate to obtain an accurate 6-DOF motion result of optical sensing apparatus 200.

Figure 20:
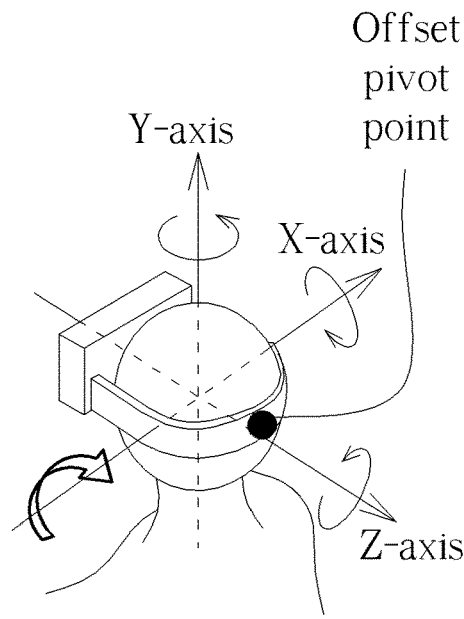
FIG. 20 shows another example of the relation between the overall estimated motion type (movement pattern) and the movement/motion of the user's head when the user is operating the optical sensing apparatus (head-mounted device).
Figure 20:
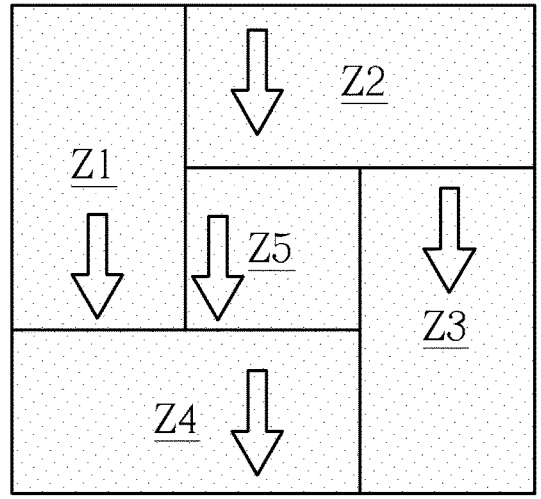

FIG. 20 shows another example of the relation between the overall estimated motion type (movement pattern) and the movement/motion of the user's head when the user is operating the optical sensing apparatus (head-mounted device). As shown in FIG. 20, the processor 215 may detect/decide that the images at image zones Z1, Z2, and Z3 have substantially identical motion vectors with two-dimensional directions and the images at image zones Z4, Z5 have different motion vectors with two-dimensional directions, and the processor 215 can determine that the user' head has a positive pitch motion with an offset pivot point at Y-axis correspondingly. This example shows that the images at image zones Z1, Z2, and Z3 have substantially identical motion vectors with two-dimensional directions and the images at image zones Z4, Z5 have different motion vectors with two-dimensional directions. Accordingly, if detecting this, the processor 215 can determine that the user' head has a positive pitch motion with an offset pivot point at Y-axis correspondingly and then classify the motion type of 6-DOF motion as a positive pitch motion type (movement pattern) with an offset pivot point at Y-axis. The processor 215 then is arranged to calculate or derive real motion parameters based on the estimated motion type, moving directions/ vectors of images at the image zones Z1-Z5. After calculating the real motion parameters, the processor 215 can estimate to obtain an accurate 6-DOF motion result of optical sensing apparatus 200.

Figure 21:
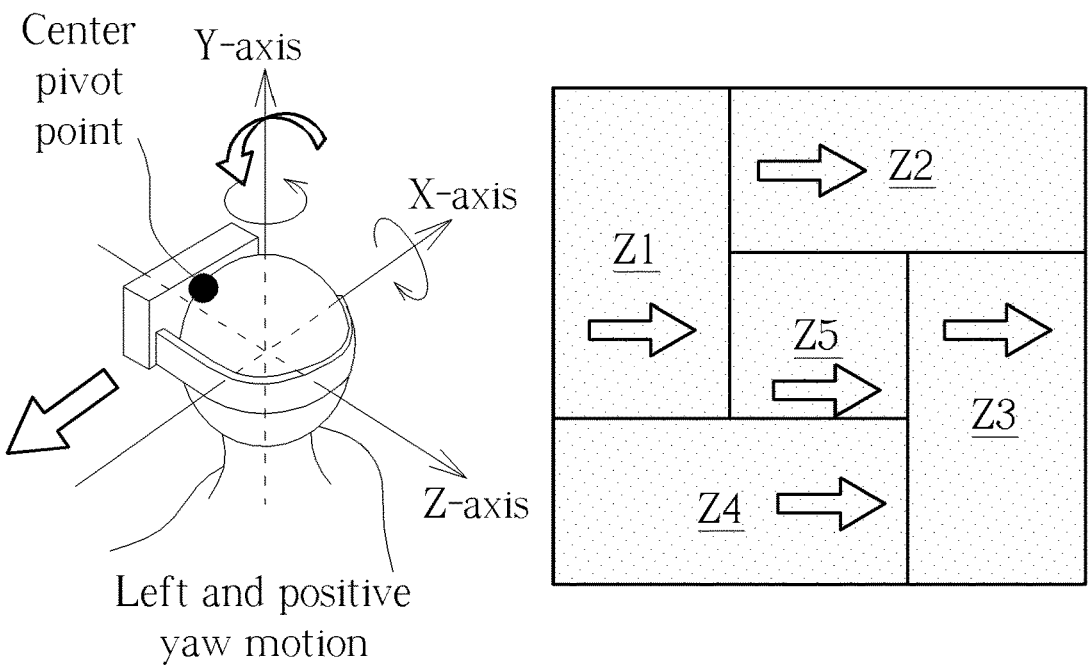
FIG. 21 shows another example of the relation between the overall estimated motion type (movement pattern) and the movement/motion of the user's head when the user is operating the optical sensing apparatus (head-mounted device).

Further, the motion type may be a combination of two movements/motions among the left movement, the right movement, the up movement, the down movement, the roll movement, the yaw movement, and the pitch movement. For example, FIG. 21 shows another example of the relation between the overall estimated motion type (movement pattern) and the movement/motion of the user's head when the user is operating the optical sensing apparatus (head-mounted device). As shown in FIG. 21, the processor 215 may detect/decide that the images at image zones Z1-Z5 have motion vectors with only one-dimensional direction wherein the images at zones Z1, Z3 have substantially identical motion vectors, the images at zones Z2, Z4 have substantially identical motion vectors different from the vectors of zones Z1, Z3, and the motion vector of the image at zone Z5 is different from other motion vectors. The processor 215 can determine that the user' head has a left and positive yaw motion with a center pivot point correspondingly.

This example shows that the images at image zones Z1-Z5 have motion vectors with only one-dimensional direction wherein the images at zones Z1, Z3 have substantially identical motion vectors, the images at zones Z2, Z4 have substantially identical motion vectors different from the vectors of zones Z1, Z3, and the motion vector of the image at zone Z5 is different from other motion vectors. Accordingly, if detecting this, the processor 215 can determine that the user' head has a left and positive yaw motion with a center pivot point correspondingly and then classify the motion type of 6-DOF motion as a left and positive yaw motion with a center pivot point. The processor 215 then is arranged to calculate or derive real motion parameters based on the estimated motion type, moving directions/vectors of images at the image zones Z1-Z5. After calculating the real motion parameters, the processor 215 can estimate to obtain an accurate 6-DOF motion result of optical sensing apparatus 200.

Figure 22:
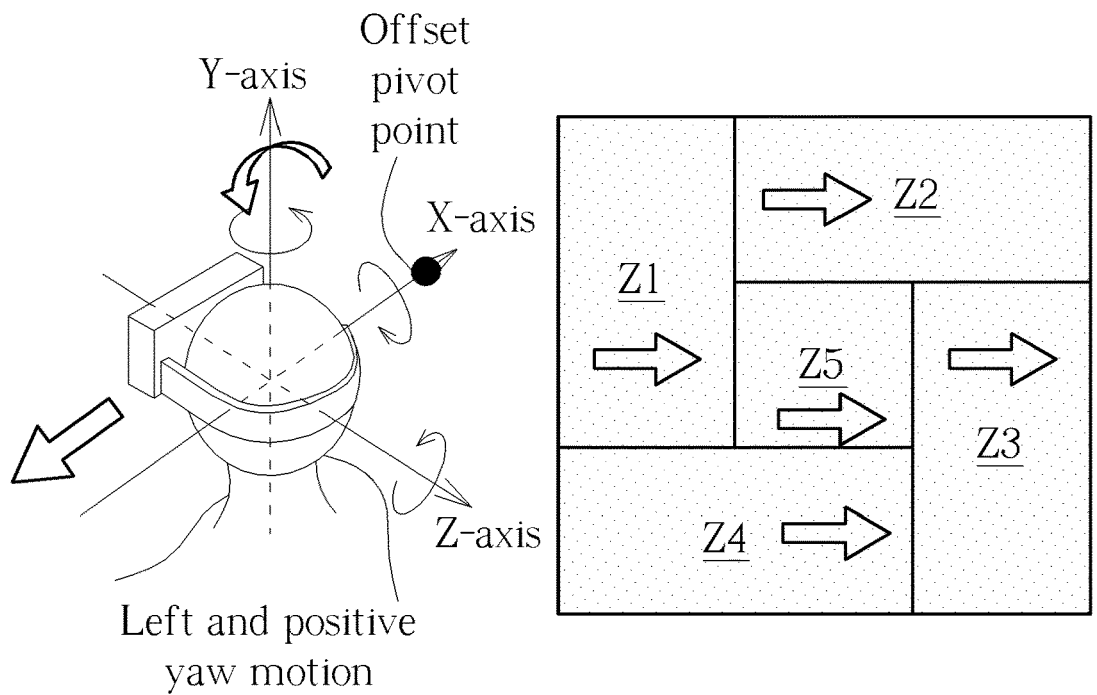
FIG. 22 shows another example of the relation between the overall estimated motion type (movement pattern) and the movement/motion of the user's head when the user is operating the optical sensing apparatus (head-mounted device).

Further, FIG. 22 shows another example of the relation between the overall estimated motion type (movement pattern) and the movement/motion of the user's head when the user is operating the optical sensing apparatus (head-mounted device). As shown in FIG. 22, the processor 215 may detect/decide that the images at image zones Z1, Z3 have motion vectors with only one-dimensional direction while the images at image zones Z2, Z4, Z5 have motion vectors with two-dimensional directions wherein the images at zones Z2, Z4 have substantially identical motion vectors, the images at zones Z1, Z3, Z5 have different motion vectors. The processor 215 then can determine that the user' head has a left and positive yaw motion with an offset pivot point at X-axis correspondingly. The processor 215 then is arranged to calculate or derive real motion parameters based on the estimated motion type, moving directions/vectors of images at the image zones Z1-Z5. After calculating the real motion parameters, the processor 215 can estimate to obtain an accurate 6-DOF motion result of optical sensing apparatus 200.

Figure 23:
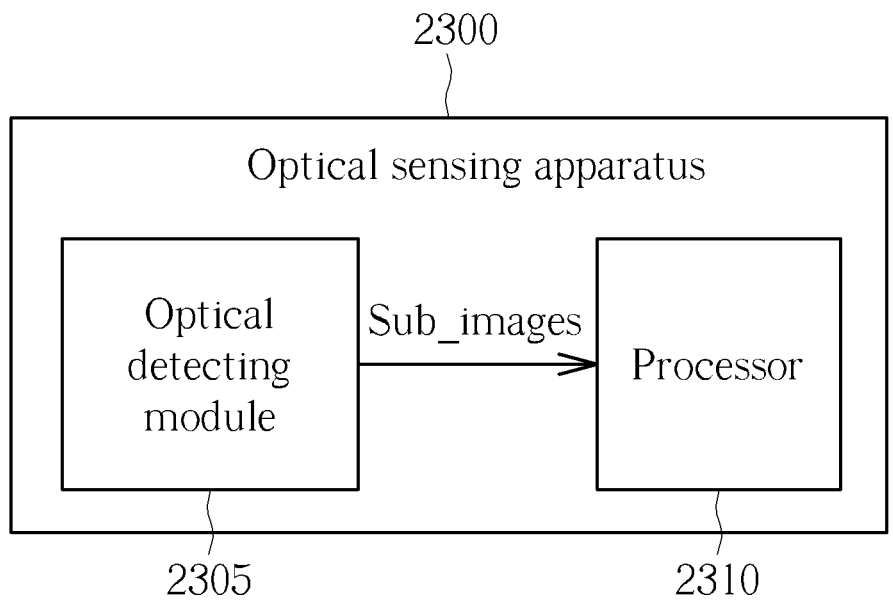
FIG. 23 is a block diagram of an optical sensing apparatus according another embodiment of the invention.

Further, the above-mentioned portion images of a frame can be regarded as multiple sub-images of the frame. FIG. 23 is a block diagram of an optical sensing apparatus 2300 implemented based on the above-mentioned concepts according another embodiment of the invention. The optical sensing apparatus 2300 is capable of estimating multi-degree-of-freedom motion and comprises an optical detecting module/circuit 2305 and a processor 2310. The optical detecting module 2305 is configured for capturing a plurality of frames wherein each frame includes a plurality of sub-images and at least two sub-images in each frame having different directions in their major axes. The processor 2310 is coupled to the optical detecting module 2305 and is configured for obtaining a motion of the optical detecting module 2305 based on variations of the at least two sub-images in two frames, e.g. motion vectors.

Figure 24:
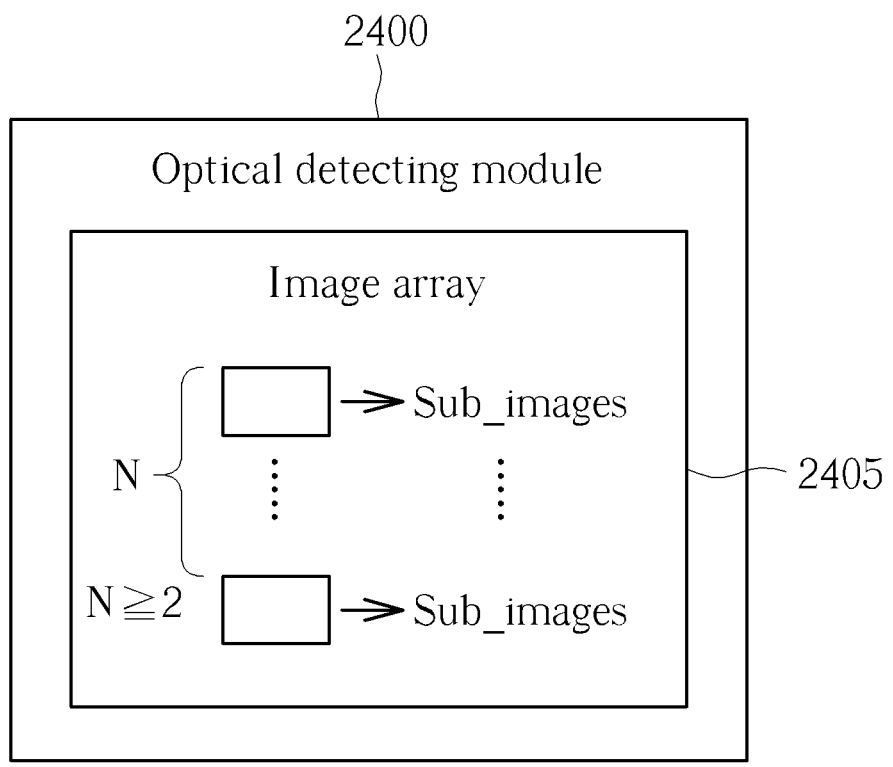
FIG. 24 is a block diagram of an optical detecting module/circuit according another embodiment of the invention.

Further, an optical detecting module/circuit is provided and employed in embodiments of the invention to capture and generate image frames for a multi-degree-of-freedom motion device wherein the image frames each has at least two sub-images so that the multi-degree-of-freedom motion device can be arranged to estimate a motion based on the captured image frames. FIG. 24 is a block diagram of an optical detecting module/circuit 2400 implemented based on the above-mentioned concepts according another embodiment of the invention. The optical detecting module/circuit 2400 is configured for capturing image frames in a multi-degree-of-freedom motion device such as VR head-mounted device or UAV device, and the multi-degree-of-freedom motion device is arranged to estimate a motion based on the captured image frames. The optical detecting module/circuit 2400 comprises an image array 2405 which is divided to N blocks to obtain N sub-images, e.g. at least two blocks to obtain at least two sub-images in one captured frame wherein the at least two blocks have different directions in their major axes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensing apparatus capable of estimating multi-degree-of-freedom motion, comprising:
    an image sensor having a pixel array having a plurality of image zones, configured for sensing and capturing a frame;
    a lens, configured for varying optical magnifications of a plurality of portion images of the frame to generate a plurality of reconstructed images with different field of views, the portion images of the frame respectively corresponding to the image zones; and
    a processor, coupled to the lens, configured for estimating and obtaining at least one motion result for the reconstructed images to estimate the motion of the optical sensing apparatus.

2. The optical sensing apparatus of claim 1, wherein the image zones have at least two image zones selected from a top left image zone, a top right image zone, a bottom left image zone, and a bottom right image zone within the frame.

3. The optical sensing apparatus of claim 1, wherein the image zones have a center image zone and a plurality of peripheral image zones.

4. The optical sensing apparatus of claim 3, wherein the peripheral image zones have four image zones.

5. The optical sensing apparatus of claim 3, wherein the peripheral image zones have eight image zones, and the center image zone and the eight image zones form a style box.

6. The optical sensing apparatus of claim 1, wherein the lens is with a fish-eye type lens to vary the optical magnifications of the portion images of the frame.

7. The optical sensing apparatus of claim 1, wherein the processor is arranged for preliminarily classifying the multi-degree-of-freedom motion of the optical sensing apparatus into a particular motion type according to motion results of all the reconstructed images, and then for estimating the multi-degree-of-freedom motion based on the motion results by referring to the particular motion type.

8. The optical sensing apparatus of claim 7, wherein the processor is arranged for deciding the particular motion type by referring to a plurality of directions associated with the motion results of all the reconstructed images.

9. The optical sensing apparatus of claim 7, wherein the particular motion type means at least one movement among left movement, right movement, up movement, down movement, roll movement, yaw movement, and pitch movement.

10. The optical sensing apparatus of claim 9, wherein the particular motion type means a combination of two movements among the left movement, the right movement, the up movement, the down movement, the roll movement, the yaw movement, and the pitch movement.

11. The optical sensing apparatus of claim 1, wherein the reconstructed images respectively correspond to a plurality of motion directions, and the processor is arranged to generate the motion of the optical sensing apparatus according to at least one motion direction associated with at least one reconstructed image.

12. A method capable of estimating multi-degree-of-freedom motion of an optical sensing apparatus, comprising:
    providing an image sensor having a pixel array having a plurality of image zones to sense and capture a frame;
    providing and using a lens to vary optical magnifications of a plurality of portion images of the frame to generate a plurality of reconstructed images with different field of views, the portion images of the frame respectively corresponding to the image zones; and estimating and obtaining at least one motion result for the reconstructed images to estimate the multi-degree-of-freedom motion of the optical sensing apparatus.

13. The method of claim 12, wherein the image zones have at least two image zones selected from a top left image zone, a top right image zone, a bottom left image zone, and a bottom right image zone within the frame.

14. The method of claim 12, wherein the image zones have a center image zone and a plurality of peripheral image zones.

15. The method of claim 14, wherein the peripheral image zones have four image zones.

16. The method of claim 14, wherein the peripheral image zones have eight image zones, and the center image zone and the eight image zones form a style box.

17. The method of claim 12, wherein the step of providing and using the lens comprises:

providing and using the lens with a fish-eye type lens to vary the optical magnifications of the portion images of the frame.

18. The method of claim 12, wherein the step of estimating the multi-degree-of-freedom motion of the optical sensing apparatus comprises:

preliminarily classifying the multi-degree-of-freedom motion of the optical sensing apparatus into a particular motion type according to motion results of all the reconstructed images; and estimating the multi-degree-of-freedom motion based on the motion results by referring to the particular motion type.

19. The method of claim 18, wherein the preliminarily classifying step comprises:

deciding the particular motion type by referring to a plurality of directions associated with the motion results of all the reconstructed images.

20. The method of claim 18, wherein the particular motion type means at least one movement among left movement, right movement, up movement, down movement, roll movement, yaw movement, and pitch movement.

21. The method of claim 20, wherein the particular motion type means a combination of two movements among the left movement, the right movement, the up movement, the down movement, the roll movement, the yaw movement, and the pitch movement.

22. The method of claim 12, wherein the reconstructed images respectively correspond to a plurality of motion directions, and the step of estimating the multi-degree-of-freedom motion of the optical sensing apparatus comprises:

generating the multi-degree-of-freedom motion of the optical sensing apparatus according to at least one motion direction associated with at least one reconstructed image.

23. An optical sensing apparatus capable of estimating multi-degree-of-freedom motion, comprising:

an optical detecting module, configured for capturing a plurality of frames, wherein each frame includes a plurality of sub-images and at least two sub-images in each frame having different directions in their major axes; and a processor, coupled to the optical detecting module, configured for obtaining a motion of the optical detecting module based on variations of the at least two sub-images in two frames.

* * * * *